(12) United States Patent
Schwager et al.

(10) Patent No.: US 8,649,422 B2
(45) Date of Patent: *Feb. 11, 2014

(54) METHOD FOR TRANSMITTING A SIGNAL OVER A POWER LINE CHANNEL AND POWER LINE COMMUNICATION MODEM

(75) Inventors: Andreas Schwager, Waiblingen (DE); Dietmar Schill, Winnenden (DE)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/601,462

(22) Filed: Aug. 31, 2012

(65) Prior Publication Data

US 2012/0320958 A1 Dec. 20, 2012

Related U.S. Application Data

(63) Continuation of application No. 12/670,584, filed as application No. PCT/EP2008/002558 on Mar. 31, 2008.

(30) Foreign Application Priority Data

Aug. 1, 2007 (EP) .................................... 07015127

(51) Int. Cl.
*H04B 1/38* (2006.01)
(52) U.S. Cl.
USPC ............ 375/222; 375/221; 375/257; 375/141
(58) Field of Classification Search
USPC .................. 375/222, 260, 221, 220, 141, 257
See application file for complete search history.

(56) References Cited

U.S. PATENT DOCUMENTS

| 7,386,055 | B2 * | 6/2008 | Morita et al. ................. 375/260 |
| 7,760,810 | B2 * | 7/2010 | Koga et al. .................... 375/260 |
| 2002/0105901 | A1 | 8/2002 | Chini et al. |
| 2006/0073805 | A1 | 4/2006 | Zumkeller et al. |
| 2006/0165117 | A1 | 7/2006 | Iwamura |

(Continued)

FOREIGN PATENT DOCUMENTS

| CN | 1784847 A | 6/2006 |
| EP | 1 146 659 | 10/2001 |

(Continued)

OTHER PUBLICATIONS

Office Action issued Jul. 24, 2012 in Japanese Patent Application No. 2010-518507 (with English-language summary).

(Continued)

*Primary Examiner* — Qutbuddin Ghulamali
(74) *Attorney, Agent, or Firm* — Oblon, Spivak, McClelland, Maier & Neustadt, L.L.P.

(57) ABSTRACT

A power line communication modem includes a receiver that receives a noise signal over a power line channel. The signal is OFDM-modulated on a set of sub-carriers, the sub-carriers being separated by a frequency separation. The power line communication modem also includes a processor that identifies a presence of a radio service within one or more fine frequency bands with a first resolution bandwidth by analyzing a plurality of fine frequency bands. The first resolution bandwidth is smaller than the frequency separation. The power line communication modem additionally includes a transmitter that excludes a signal in at least one of the plurality of fine frequency bands, in which the presence of the radio service has been identified, before transmitting the excluded signal.

17 Claims, 11 Drawing Sheets

(56) References Cited

U.S. PATENT DOCUMENTS

| | | |
|---|---|---|
| 2008/0260010 A1 | 10/2008 | Schwager et al. |
| 2010/0034304 A1 | 2/2010 | Iwamura |
| 2011/0051786 A1 | 3/2011 | Schwager et al. |
| 2011/0110408 A1 | 5/2011 | Schwager et al. |
| 2011/0116555 A1 | 5/2011 | Schwager et al. |
| 2011/0129007 A1 | 6/2011 | Schwager et al. |
| 2011/0143694 A1 | 6/2011 | Iwamura |

FOREIGN PATENT DOCUMENTS

| | | |
|---|---|---|
| EP | 1 530 313 | 11/2005 |
| EP | 1 643 658 | 4/2006 |
| JP | 7-12862 A | 1/1995 |
| JP | 8-211110 A | 8/1996 |
| JP | 2001-28562 A | 1/2001 |
| JP | 2001-156873 A | 6/2001 |
| JP | 2001-308755 A | 11/2001 |
| JP | 2002-162980 A | 6/2002 |
| JP | 2006-129470 A | 5/2006 |
| JP | 2006-174218 A | 6/2006 |

OTHER PUBLICATIONS

Office Action issued Jul. 4, 2012 in Chinese Patent Application No. 200880101314.3 (with English-language translation).

Partial European Search Report issued on May 2, 2011 in corresponding European Application No. 11 00 2795.

Extended Search Report issued Aug. 18, 2011 in European Patent Application No. 11002795.0-1246/2333974.

* cited by examiner

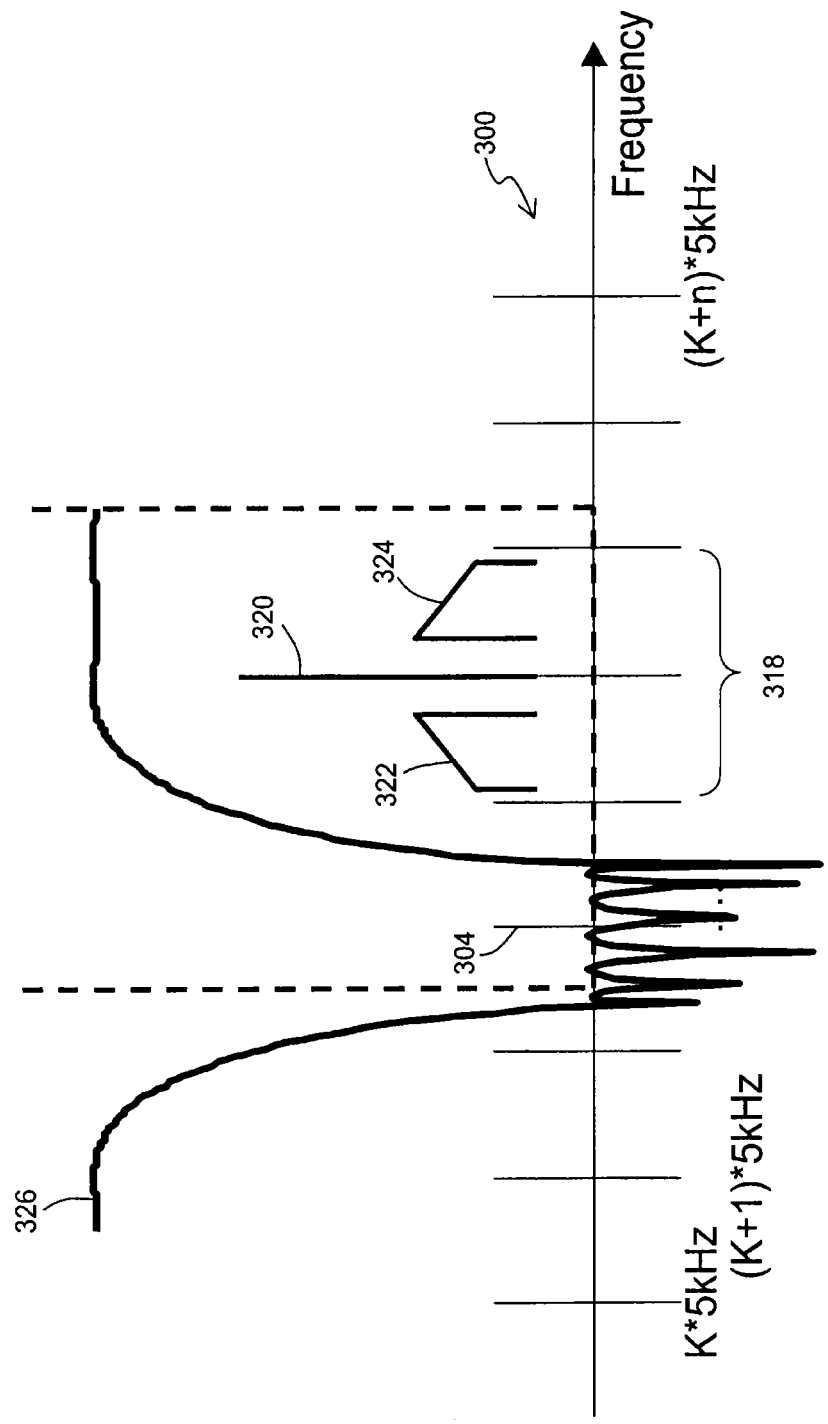

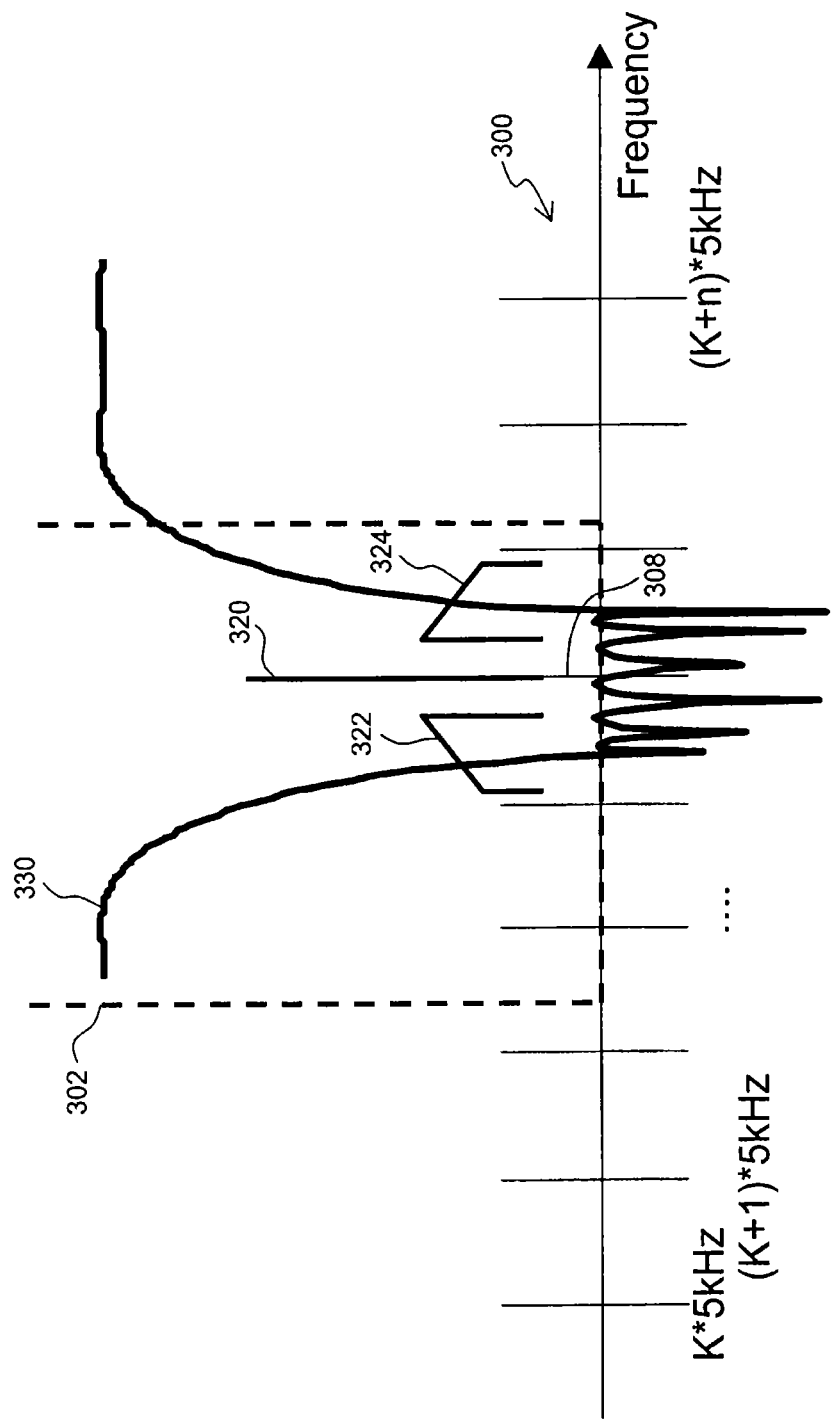

METHOD FOR TRANSMITTING A SIGNAL OVER A POWER LINE CHANNEL AND POWER LINE COMMUNICATION MODEM

CROSS REFERENCES TO RELATED APPLICATIONS

This application is a continuation of and claims the benefit of priority under 35 U.S.C. §120 from U.S. Ser. No. 12/670,584, filed Jan. 25, 2010, the entire contents of which are incorporated herein by reference. U.S. Ser. No. 12/670,584 is a national stage of PCT Application No. PCT/EP08/002558, filed Mar. 31, 2008, and claims the benefit of priority under 35 U.S.C. §119 from European Patent Application No. 07015127.9, filed on Aug. 1, 2007.

An embodiment of the invention relates to a method for transmitting a signal over a power line channel. A further embodiment of the invention relates to a power line communication modem.

BACKGROUND OF THE INVENTION

Power line communication (PLC), also called mains communication, power line transmission (PLT), broadband power line (BPL), power band or power line networking (PLN), is a term describing several different systems for using power distribution wire for simultaneous distribution of data. A carrier can communicate voice and data by superimposing an analogue signal over the standard 50 Hz or 60 Hz alternating current (AC). For indoor applications PLC equipment can use household electrical power wiring as a transmission medium.

Power line communication might have interferences to radio broadcasting stations or other external transmissions. Today, power line communication modems have fixed notch filters for amateur radio bands. Concepts of dynamic or smart notching enables PLC modems to detect ingress of radio broadcast stations. An ingress is a disturbance or noise component within a frequency band corresponding to the frequency band of the radio broadcast station. Therefore, the frequencies were radio stations have been detected shall be omitted by power line communication.

BRIEF SUMMARY

It is an object of the invention to provide a method for transmitting a signal over a power line channel and a corresponding power line communication modem that enhances the throughput of PLT systems.

The object is solved by a method for transmitting a signal over a power line channel and a power line communication modem, respectively.

Further embodiments are defined in the dependent claims.

Further details of the invention will become apparent from a consideration of the drawings and ensuing description.

BRIEF DESCRIPTION OF DRAWINGS

FIGS. 3a to 3e shows exemplary frequency diagrams of a further embodiment of the invention.

DETAILED DESCRIPTION OF THE INVENTION

In the following, embodiments of the invention are described. It is important to note that all described embodiments in the following may be combined in any way, i.e. there is no limitation that certain described embodiments may not be combined with others.

Figure 1:
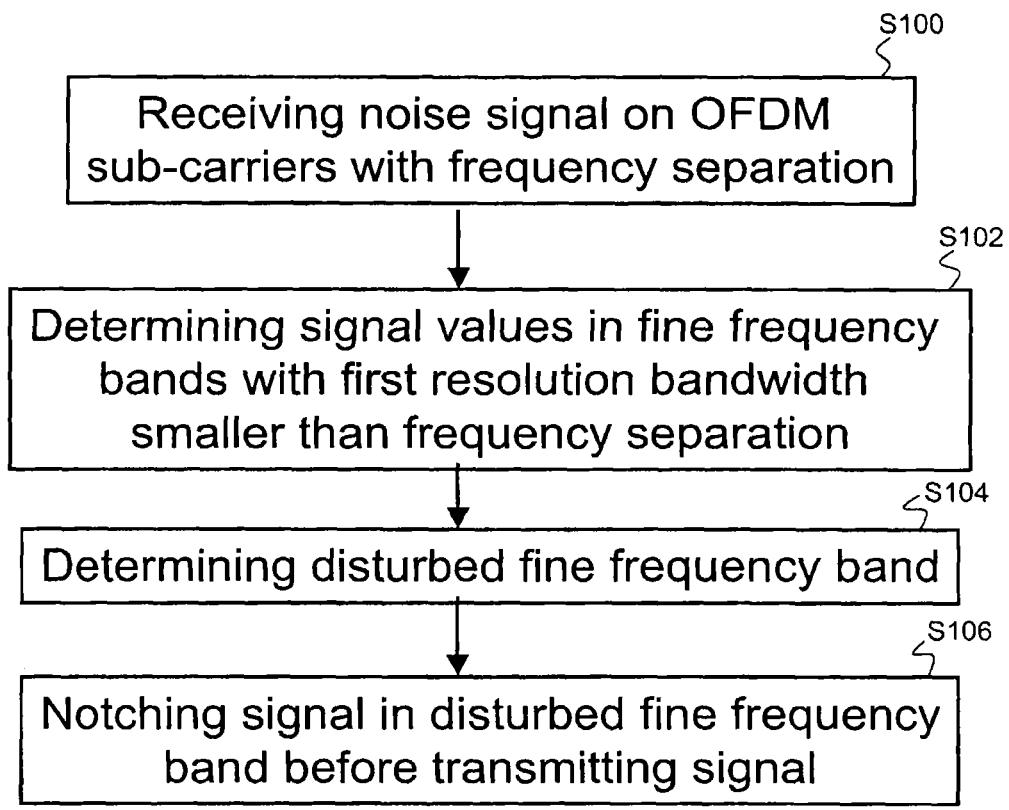
FIG. 1 shows steps of one embodiment of the invention.

In FIG. 1, in step S100 a noise signal is received via a power line channel. The wording "noise signal" used in this description also encompasses "mixed signals" that comprises a mix of noise, of ingress or disturbance signal of radio broadcast and of payload signals. The wording "noise signal" is used to emphasize that at least a disturbing signal (i.e. a broadcast station or some white noise) is present within the "noise signal" and disturbs or would disturb the reception of the payload signal.

In a PLT system signals are OFDM-modulated (orthogonal frequency division multiplex), i.e. a plurality of sub-carriers is used for transmitting the signal. OFDM is a multi-carrier modulation scheme, which uses a large number of closely spaced orthogonal sub-carriers. Each sub-carrier is modulated with a conventional modulation scheme (such as quadrature amplitude modulation (QAM)) at a low symbol rate, maintaining data rates similar to conventional single carrier modulation schemes in the same bandwidth. In practice, OFDM signals are generated using a fast Fourier transform algorithm. The primary advantage of OFDM over a single carrier scheme is its ability to cope with severe channel conditions—for example, attenuation of high frequency at a long copper wire, narrow band interference and frequency-selective fading due to multi path transmission, without complex equalization filters.

In a step S102 respective signal values of said received noise signal are determined within a plurality of fine frequency bands with a first resolution bandwidth, wherein the first resolution bandwidth is smaller than a frequency separation of the sub-carriers being used for the OFDM modulation of the signal. The signal value might be e.g. energy or power of the noise signal within the frequency bands.

The wording "fine frequency band" and (see below) "coarse frequency band" has been used throughout this description to define the relation of the bandwidths of those frequency bands. The bandwidth of the "coarse frequency band" is larger than the bandwidth of the "fine frequency band".

In a step S104 a first disturbed frequency band of said plurality of fine frequency bands is determined based on the respective signal values. Within this step S104 a disturbing part of an external radio transmission, i.e. a radio transmission signal on a channel falling into the frequency interval that is used for transmitting the OFDM-modulated signal can be determined.

In a step S106 the determined first disturbed frequency band is notched, i.e. filtered out, from a signal before transmitting said signal via the power line channel.

The notching step might be performed by using a so-called notch-filter, e.g. a digital filter with a corresponding set of filter coefficients, which is calculated to deliver at its output essentially only frequency components out of the "notched" or "blocked" frequency band.

With the embodiment of this invention it is possible to identify the exact frequency, where an ingress of a radio broadcast station takes place.

Usually short wave radio stations use a 10 kHz bandwidth and are aligned to a frequency grid (or raster) of integer multiples of 5 kHz. Today's OFDM power line communication modems use a carrier spacing between 19 kHz and 60 kHz. If these modems measure the noise on power lines using a fast Fourier transformation they are able to separate frequency points equal to the carrier spacing (frequency separation). In order to protect the short wave radio stations against disturbances from the power line communication system conflicting frequency bands are filtered out from the power line communication spectrum. Thus, via detecting an ingress or disturbing signal of a fixed radio station more precisely, it is possible to position a notch filter more precisely. This more precisely positioned notch filter can be performed with a smaller stop bandwidth than a less precisely positioned notch filter in order to ensure that the frequency bands of the radio station and the power line communication system do not conflict. Thus, additional sub-carriers for transmitting the power line signal can be used outside the stop bandwidth of the notch filter. Therefore, the transmission bandwidth might be enhanced and possibly higher constellations can be used within an OFDM-modulation scheme.

Figure 2:
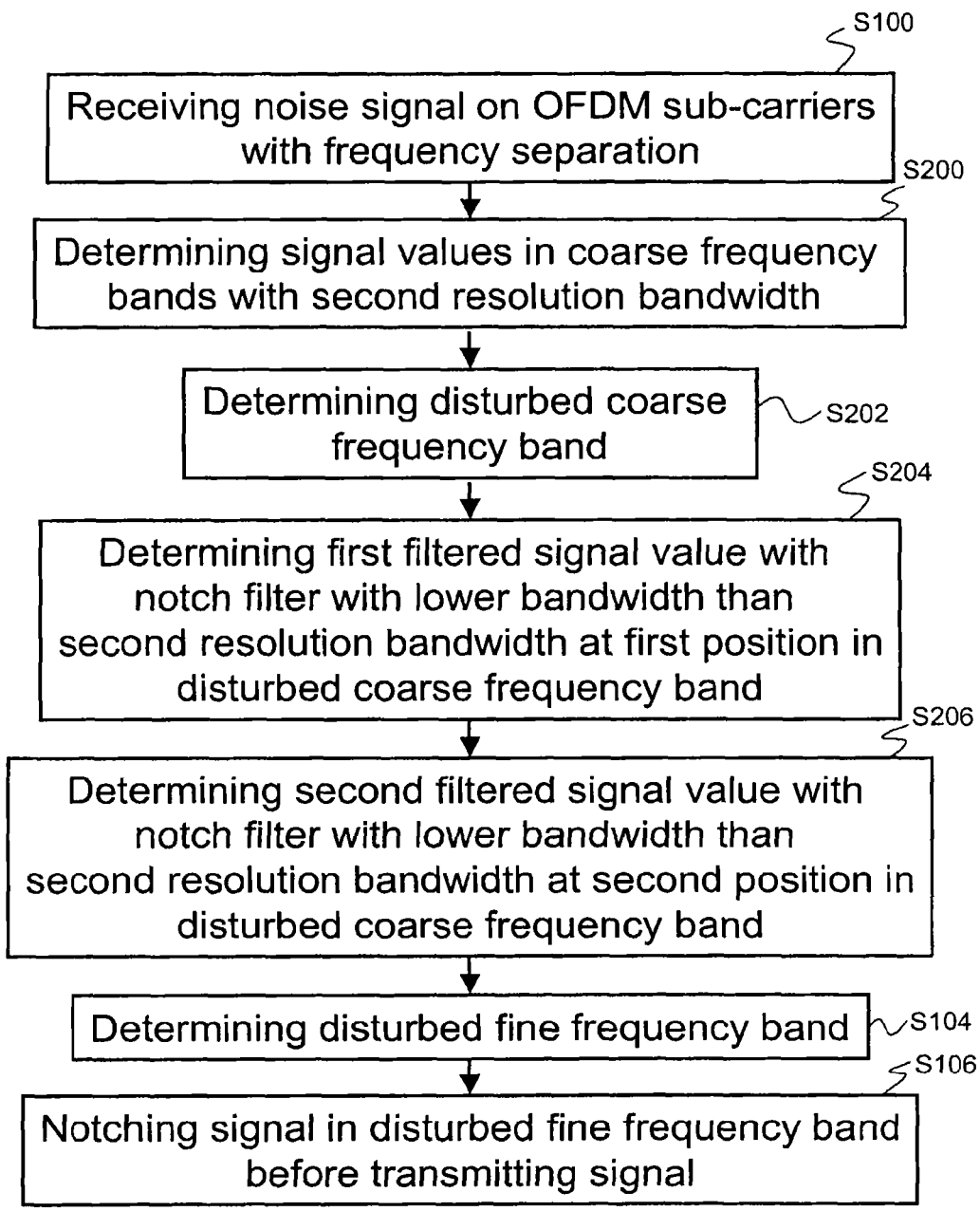
FIG. 2 shows steps of a further embodiment of the invention.

In FIG. 2 steps for a further embodiment of the invention are shown, wherein after receiving the noise signal in step S100 in a step S200 respective signal values of said received noise signal within a plurality of coarse frequency bands with a second resolution bandwidth are determined.

If said second resolution bandwidths is equal to said frequency separation then the same unit within a power line communication modem, i.e. a Fast Fourier Transformation (FFT) algorithm can be used for modulating the signal on the set of sub-carriers and for dividing the frequency interval in said plurality of coarse frequency bands.

However, it is also possible to use a second resolution bandwidth that is larger or smaller than the frequency separation.

In a step S202 a second disturbed frequency band of said plurality of coarse frequency bands is determined based on said respective signal values. For instance, the respective signal values of the disturbed frequency band might be higher than a predetermined threshold, thereby indicating that some unwanted noise or additional signal is present within said disturbed frequency band.

In a step S204 a first filtered signal value is determined by applying a first notch filter with a smaller bandwidth than said second resolution bandwidth to said received noise signal at a first position within said second disturbed frequency band. While applying the first notch filter with the smaller bandwidth at a first position within the disturbed frequency band, a part of the noise signal within said disturbed frequency band will be notched or filtered out, so that the first filtered signal value will depend on the position of a disturbing signal.

In a step S206 a second filtered signal value is determined by applying a second notch filter with a smaller bandwidth than the second resolution bandwidth to said received noise signal at a second position within the second disturbed frequency band. The first filtered signal value and the second filtered signal value will depend on the exact position of the disturbing signal within the disturbed frequency band. Thus, in case the disturbing signal is within the bandwidth of the first notch filter then the first filtered signal value will be lower than the second filtered signal value, since the disturbing signal will not be filtered out from the second notch filter. The first notch filter might be realized as a digital filter with a first set of filter coefficients and the second notch filter might be realized as a digital filter with a second set of filter coefficients.

In step S104 the first disturbed frequency band with a smaller bandwidth than the bandwidth of the disturbed coarse frequency band is determined based on a comparison between said first filtered signal and said second filtered signal. For instance, the first disturbed frequency band corresponds to the bandwidth and the first position of the first notch filter in the example given above, where the first filtered signal value is lower than the second filtered signal value.

In step S106 the signal is notched in the first disturbed frequency band before transmitting said signal, thereby increasing the possible bandwidth for the transmission of power line signals and decreasing the influence from disturbance signals. At the same time an influence of the power line communication to the reception of the services of the radio broadcast station is decreased.

In a further embodiment said first notch filter and said second notch filter have the same bandwidth, so that a similar filter algorithm can be used.

In a further embodiment a plurality of filtered signal values are determined by applying a plurality of notch filters with a smaller bandwidth than said first resolution bandwidth to said received noise signal at a corresponding plurality of positions within said second disturbed frequency band and said step of determining said disturbed frequency band is based on a comparison of a plurality of filtered signal values. When using such a plurality of filtered signal values the exact position of the disturbing signal can be detected more precisely.

In a further embodiment the number of said plurality of notch filters is determined based on the bandwidth of said notch filters, the frequency separation of the sub-carriers and of a radio signal channel spacing of a short wave radio transmission system. While adapting the number of said plurality of notch filters it is possible to cover the whole frequency separation in order to determine the exact position of the disturbing radio signal.

In a further embodiment the positions of the notch filters are equal to potential radio signal channel positions of the short wave radio transmission system. For instance, it is known that short wave radio stations usually use a 10 kHz bandwidth and are aligned to a frequency grid of integer multiplex of 5 kHz as it has been described already above. When positioning the notch filters directly on a carrier of a channel of a short wave radio station and adapting a bandwidth of the notch filter in accordance with the bandwidth of the radio station signal the effect of notching is present very clearly in the filtered signal value.

According to a further embodiment the position of the notch filters are equally spaced so that the position of the notch filters correspond to equally spaced channel positions of the radio signals.

According to a further embodiment the determination of the first filtered signal value and/or the second filtered signal value are performed in parallel for a plurality of second disturbed frequency bands. When using a Fast Fourier Transformation to determine the respective signal values the notch filters can be applied in parallel to the received noise signal and the first and/or second filtered signal values are determined for each of said second disturbed frequency bands.

In a further embodiment the notch filter can be used for notching the signal before transmitting and for filtering the received noise signal. Thus, only one notch filter has to be implemented.

In a further embodiment the step of determining respective signal values is performed by a first Fast Fourier Transformation and the step of transmitting said signal is based on a second Fast Fourier Transformation with a larger resolution bandwidth than said first Fast Fourier Transformation. Thus, for transmitting a signal less computing power is used than for detecting an ingress of a radio broadcast station. Since normally the Fast Fourier Transformation is used more frequently for transmitting signals than for detecting ingress, since the channels of the radio broadcast station do not change so often, with this embodiment computing power can be saved.

Figure 3A:
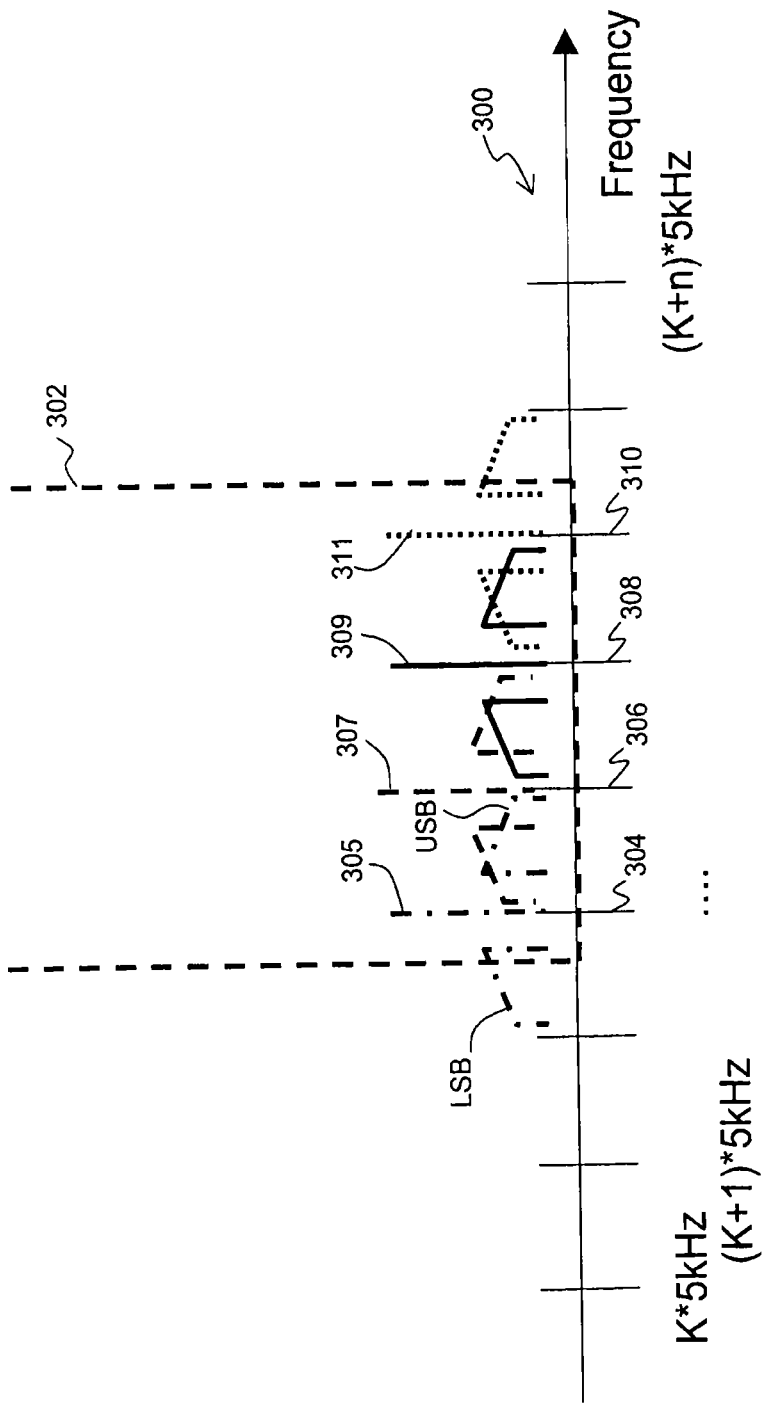

In FIG. 3a an exemplary frequency diagram is depicted where a frequency grid 300 shows the possible positions of a short wave radio transmission system with a spacing of 5 kHz. With a 2 k-FFT (Fast Fourier Transformation) for an OFDM-modulated signal 2048 points are calculated, so that for a 40 MHz bandwidth a spacing of 19.5 kHz between the sub-carriers of the OFDM-signal results. The corresponding resolution bandwidth (ResBW) 302 is depicted schematically within FIG. 3a.

As it can be seen from FIG. 3a four possible positions 304, 306, 308, 310, are possible for a carrier 305, 307, 309, 311 of an Amplitude modulated (AM) signal of a short wave (SW) radio station within the resolution bandwidth 302. Each of these signals with carriers 305, 307, 309, 311 would disturb a received signal and would result in an enhanced noise in the respective signal value, which is detected. For each carrier a corresponding low side band (LSB) and upper side band (USB) are depicted as well. Since it is not clear whether the carrier is at a position 304, 310 at one of the ends of the resolution bandwidth 302, not only a carrier corresponding to the resolution bandwidth 302 has to be notched for transmitting a signal on the power line channel but also adjacent sub-carriers, because otherwise the lower side band of the first carrier at position 304 or the upper side band of the carrier position 310 would be disturbed or would disturb the power line transmission.

Normally the radio service cannot be demodulated by power line communication modems.

In FIG. 3b there is depicted the same frequency grid 300 and the resolution bandwidth 302 but only one disturbing signal 318 with a carrier 320 and a lower side band 322 and an upper side band 324. In addition, a transfer curve 326 of a first notch filter is depicted. The first notch filter is centered on the first position 304 within the resolution bandwidth 302. Since no part of the disturbing signal 318 is notched a first filtered signal value will be essentially the same as without the first notch filter.

Figure 3C:
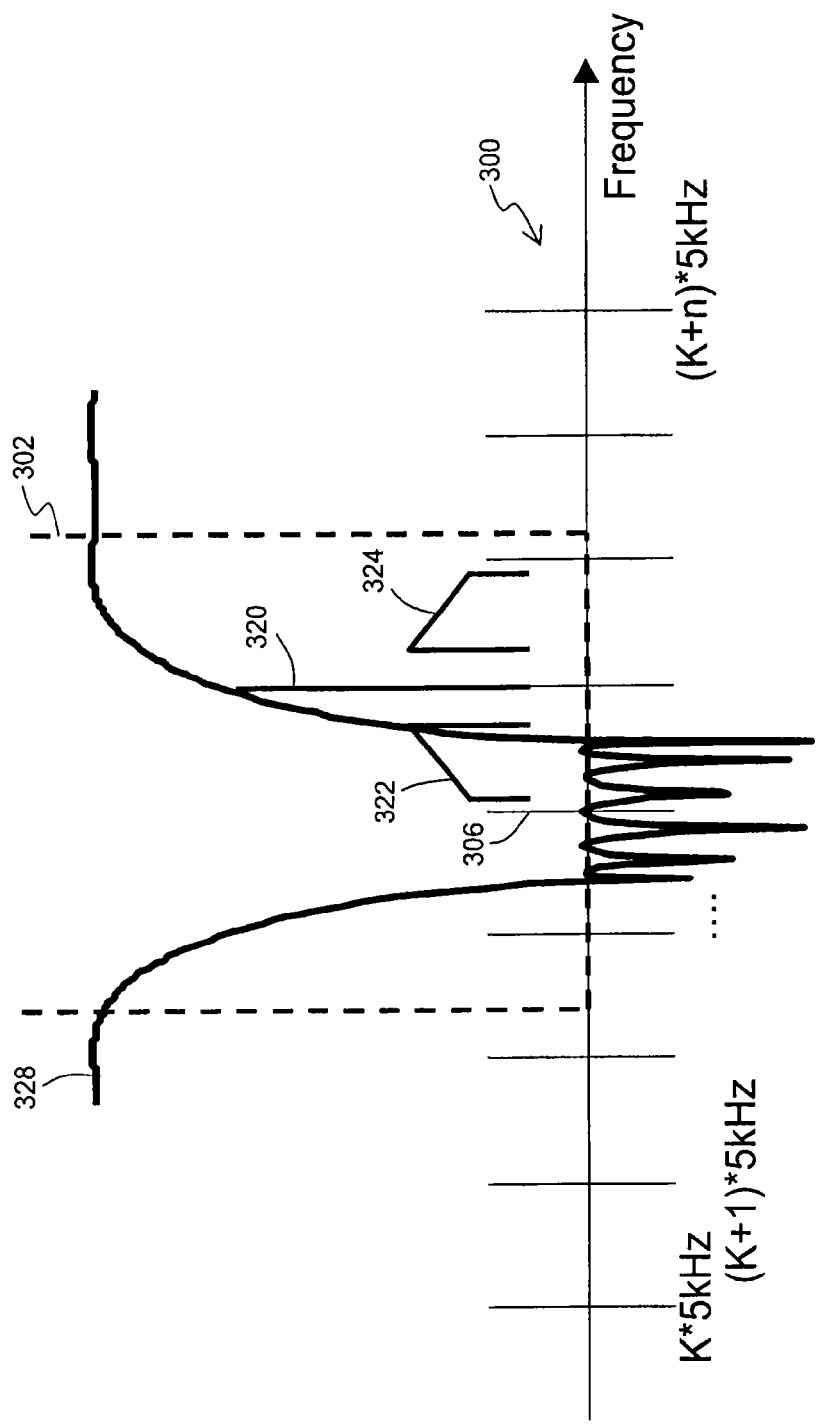

In FIG. 3c a transfer curve 328 of a second notch filter is depicted, which is centered on a second position 306, within the resolution bandwidth 302. The lower side band 322 will be notched partly by the transfer curve 328. Thus, a respective second filtered signal value will be lower than the first filtered signal value or the signal value taking into account the whole resolution bandwidth 302.

In FIG. 3d a transfer curve 330 of a third notch filter is depicted, which is centered on the third position 308 of the frequency grid 300 within the resolution bandwidth 302. The transfer curve 330 of the third notch filter is centered on the same position as the position of the carrier 320 of the disturbing radio transmission signal and may be derived from a digital filter with a third set of filter coefficients. Since the carrier 320 as well as the major part of the lower side band 322 and the upper side band 324 of the radio transmission signal will be notched the third filtered signal value will be lower than the first or second filtered signal value and also lower than the signal value for the whole resolution bandwidth 302.

Figure 3E:
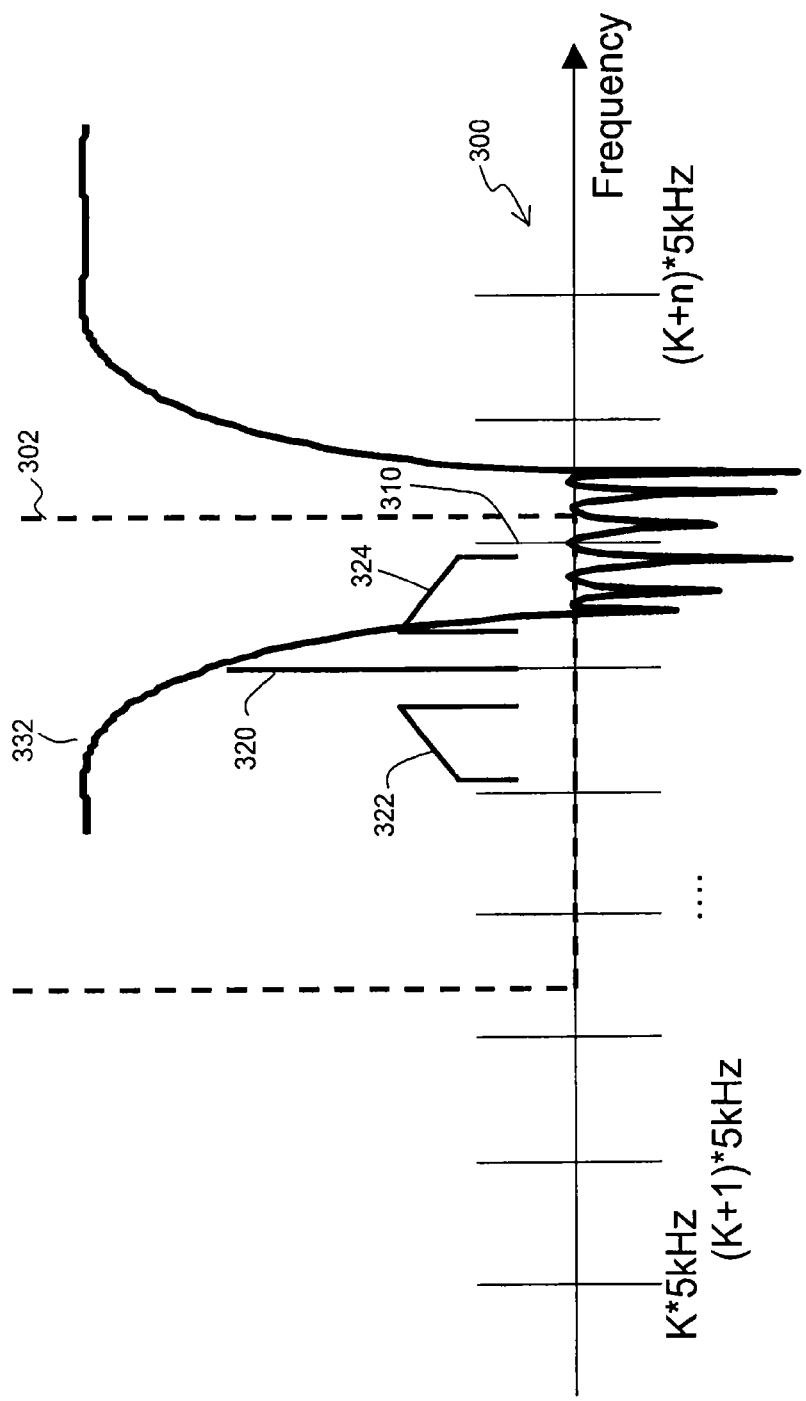

In FIG. 3e a fourth transfer curve 332 is depicted at the fourth position 310 within the resolution bandwidth 302 of the frequency grid 300. Only a part of the upper side band 324 is notched so that the value of the fourth filtered signal value will be larger than the third filtered signal value of the transfer curve 330.

Thus, the transfer curves 326, 328, 330 and 332 will be shifted or tuned to all possibilities of the frequency grid 300 within the resolution bandwidth 302, in which a disturbed signal has been detected. When comparing the respective filtered signal values the frequency location of the ingress at position 308 can be detected by comparing the output of the fast Fourier transformation after each tuning step.

It is evident that also ingresses at more than one position can be detected by comparing the respective outputs of the fast Fourier transformation.

Figure 4:
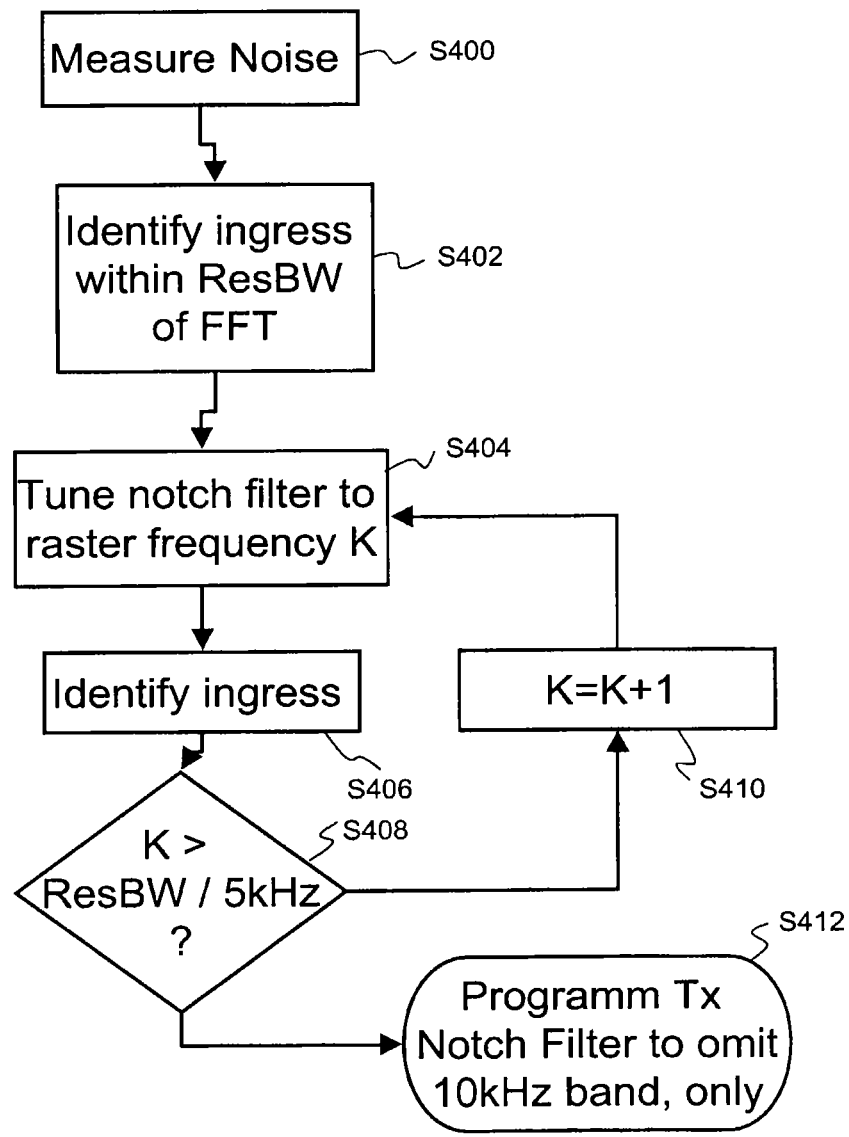
FIG. 4 shows steps of a further embodiment of the invention.

In FIG. 4 steps of a further embodiment are depicted. In a step S400 the noise in a frequency band is measured and in a step S402 an ingress is identified within the resolution bandwidth of the Fast Fourier Transformation. In a step S404 the notch filter is tuned to a raster frequency k, i.e. the first frequency of the raster within the resolution bandwidth. In a next step S406 a potential ingress is identified. In a step S408 it is checked whether the last tuning step has been achieved already by checking whether the number of the raster frequency is greater than the ratio of the resolution bandwidth and the spacing of the raster (i.e. 5 kHz). In case the number has not been achieved the last number in a step S410, the number is increased by 1 and a step S404 is performed again with the increased number k. In case the last tuning step has been performed in step S412 the transmission notch filter is programmed to omit only a 10 kHz band, which has been determined from the minimum value of the filtered signal values. Taking into account the example of FIGS. 3A to 3E the notch filter for the transmission would be programmed to the third position 308, thereby preventing any disturbance between the radio signal and the power line communication signal.

Figure 5:
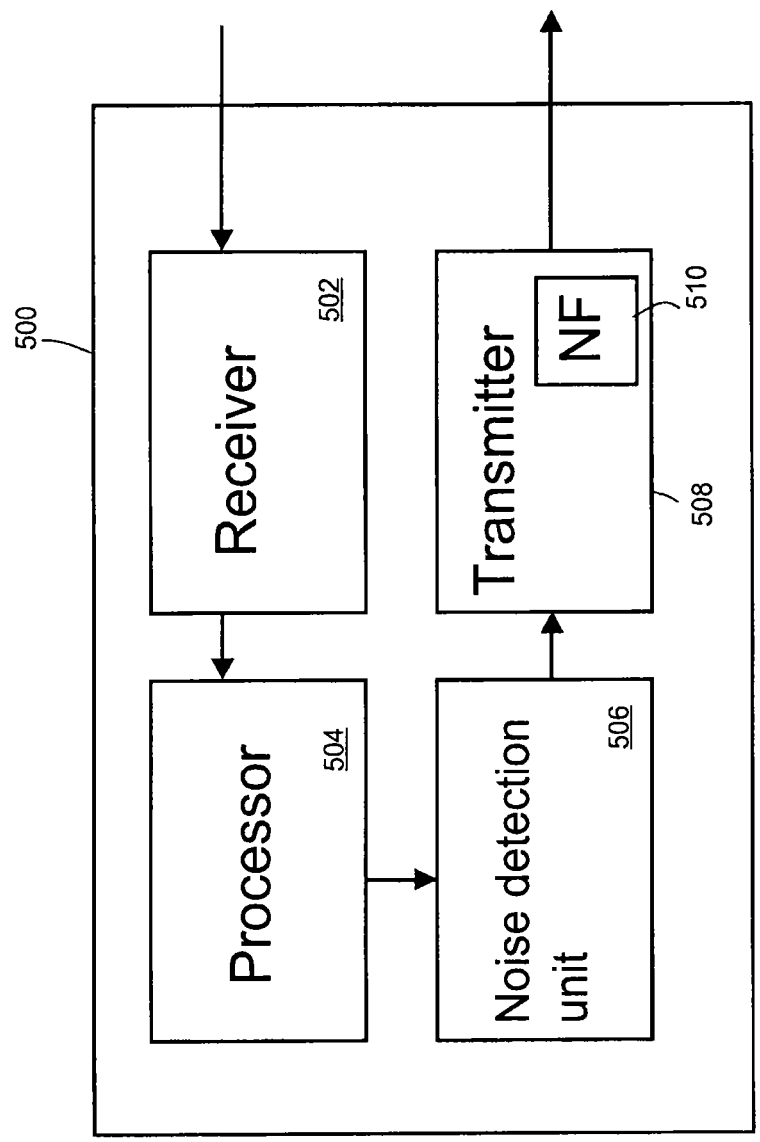
FIG. 5 shows a block diagram of a power line communication modem according to a further embodiment of the invention.

In FIG. 5 a block diagram of a power line communication modem 500 is depicted which comprises a receiver 502, a processor 504, a noise detection unit 506 and a transmitter 508. The receiver 502 is configured to receive a signal over a power line channel 510, wherein the signal is OFDM-modulated on a set of sub-carriers said sub-carriers being separated by a frequency separation.

The receiver 502 is connected to the processor 504, which is configured to determine respective signal values of the received signal within a plurality of fine frequency bands with the first resolution bandwidth, wherein the first resolution bandwidth is smaller than the frequency separation. The processor 504 is connected to a noise detection unit 506, which is configured to determine a first disturbed frequency band of said plurality of fine frequency bands based on the respective signal values and the noise detection unit 506 is connected to a transmitter 508 which is configured to notch the signal in the first disturbed frequency band with a notch filter 510.

The power line communication modem 500 can use a higher number of sub-carriers for OFDM-modulating a signal, since less subcarriers have to be notched by the notch filter 510, as it has been explained above.

Figure 6:
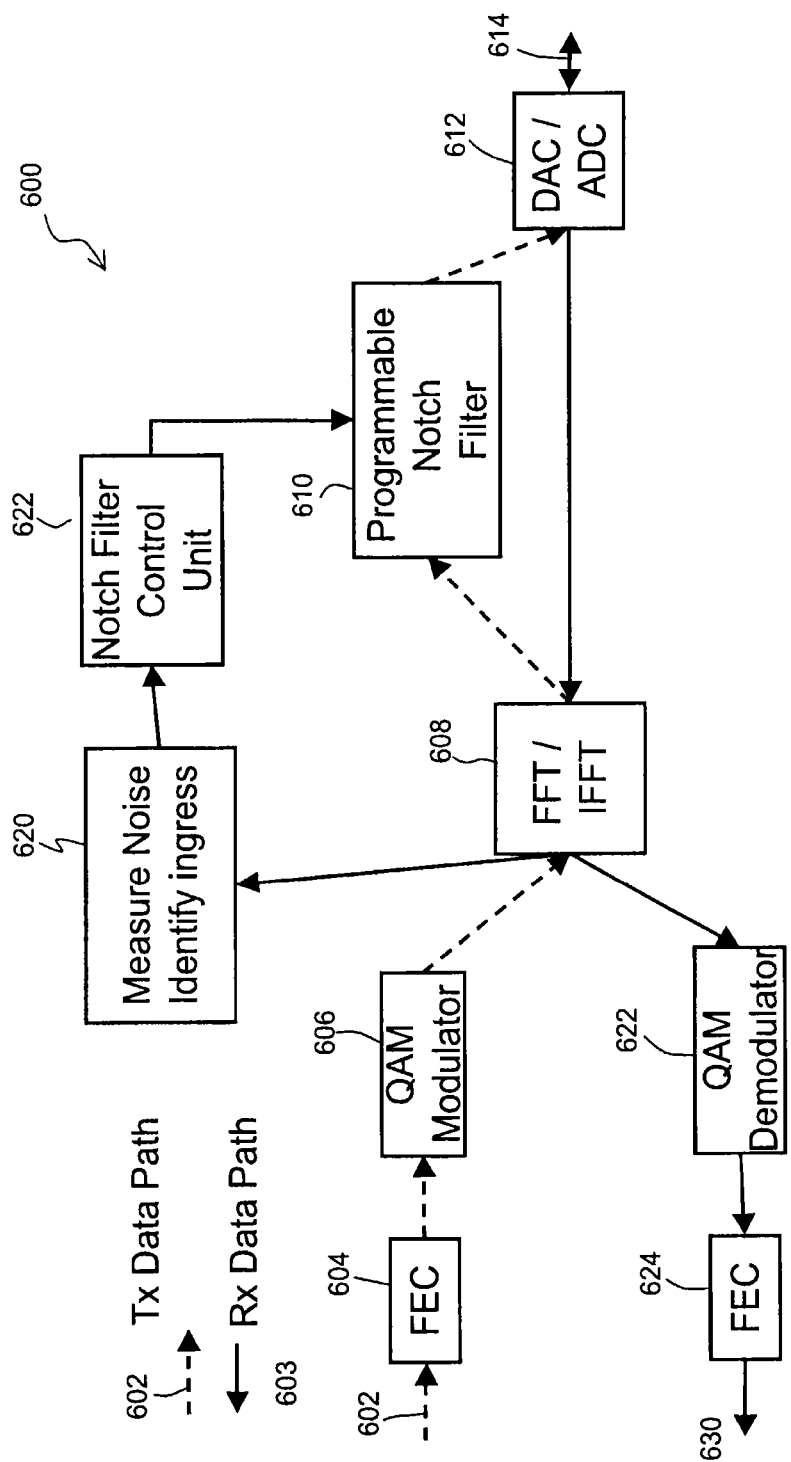
FIG. 6 shows a block diagram of a power line communication modem according to a further embodiment of the invention.

In FIG. 6 a further embodiment of a power line communication 600 is depicted. In FIG. 6 a transmission data path 602 in a power line communication modem 600 is depicted as well as a receiving data path 603. On the transmitting data path 602 a signal which is intended to be transmitted is forward error corrected (FEC) in a forward error correction block 604 and afterwards quadrature amplitude modulated (QAM) in a quadrature amplitude modulator 606. In a processor 608, which is adapted to perform a Fast Fourier Transformation or an Inverse Fast Fourier Transformation (IFFT), a combined signal is determined and transmitted via a programmable notch filter 610 to a digital-to-analogue converter (DAC) 612 and then transmitted over the power line channel 614.

When receiving the signal from the power line channel 614, the signal is analogue-to-digital converted (ADC) in the converter block 612 and afterwards the processor 608 calculates signal values for a plurality of frequency bands. The output of the signal values is used in the noise detection unit 620 which is connected to a notch filter control unit 622 which is configured to program the notch filter 610. Thus, depending on the position of identified signal values or identified noise and the respective frequency bands the programmable notch filter 610 can be programmed with a correct bandwidth and at the correct position in order to suppress or notch parts of the signal which would otherwise either disturb signals of radio broadcast stations or will be disturbed by the same. On the other hand the outcome of the processor 608 is input in a quadrature amplitude modulation demodulator 622 and afterwards in an inverse forward error correction block 624 to obtain the received signal 630.

Figure 7:
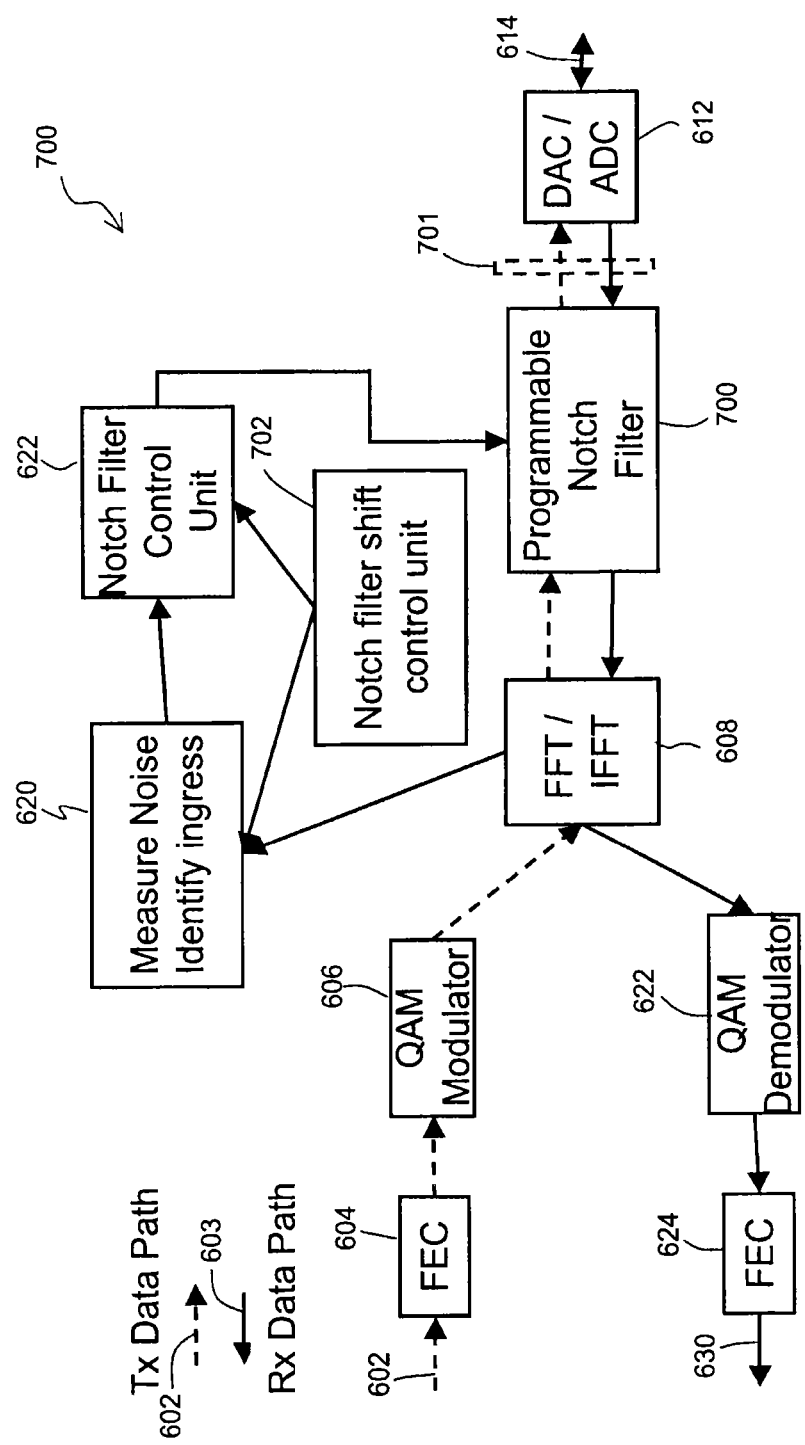
FIG. 7 shows a block diagram of a power line communication modem according to a further embodiment of the invention.

In FIG. 7 a further embodiment for a power line communication modem 700 is depicted in which similar units as in the embodiment of FIG. 6 are depicted with the same reference signs. This embodiment of the power line communication modem has a programmable notch filter 700 which is not only situated in the transmission path 602 but also in the receiving path 603 or optionally can be switched by a switch 701 between the transmission path 602 and the receiving path 603. In addition a notch filter shift control unit 702 is connected to the noise detection unit and to the notch filter unit 622. The notch filter shift control unit 702 is configured to shift the position of said programmable notch filter into a plurality of positions within the second disturbed frequency band in order to tune the notch filter to different positions within the resolution bandwidth of the Fast Fourier Transformation. The FFT process is implemented in the processor 608 in order to identify in the noise detection unit 620 the exact position of a disturbing signal from an external radio source.

With the embodiments of this invention a 10 kHz ingress within a power line communication system can be identified even if the Fast Fourier Transformation size is designed to provide a larger resolution bandwidth in frequency domain. The programmable notch filter 700 that is already available to omit the notched frequency at the transmission path can be easily reused. Thus, the performance of a power line communication modem, i.e. data throughput and coverage can be enhanced and the coexistence to non-power line communication application is facilitated. The programmable notch filter can be programmed to provide a 10 kHz notch aligned to the raster frequency of a short wave radio broadcast. The notch can be tuned sequentially to each raster frequency inside the resolution bandwidth of the fast Fourier transformation at frequency points of interest. Comparing the results after the fast Fourier transformation after each tuning step, the ingress can be located to a 10 kHz band. This might be done in parallel for every frequency band, where an ingress has been detected. The ingress is detected by comparing if the noise measurement enhances the threshold.

In a data receiving mode, the power line communication modem can detect an ingress of a narrowband interferer, as well. These frequencies might be notched out of the received communication spectrum. This eliminates the unwanted narrowband signal ingress before demodulation of the OFDM data. The programmable notch-filter 700 used to insert notches in the transmission spectrum might be reused therefore.

Alternatively, using a larger fast Fourier transformation size with a higher resolution bandwidth (i.e. a 4k-FFT with 4096 points instead of a 2k-FFT with 2048 points) when measuring the noise can increase the resolution bandwidth of a power line communication modem in order to determine the disturbed fine frequency band.

The invention claimed is:

1. A method for transmitting a signal over a power line channel, said signal being Orthogonal Frequency Division (OFDM)-modulated on a set of sub-carriers, and said sub-carriers being separated by a frequency separation, the method comprising:
  identifying, using processing circuitry, a presence of a radio service within one or more fine frequency bands with a first resolution bandwidth by analyzing a plurality of fine frequency bands, said first resolution bandwidth being smaller than said frequency separation; and
  excluding, using circuitry, a portion of a signal in at least one of the plurality of fine frequency bands, in which the presence of the radio service is identified, before transmitting said OFDM-modulated signal.

2. The method according to claim 1, wherein said identifying includes identifying signals of the radio service.

3. The method according to claim 1, wherein said identifying includes measuring noise in the plurality of fine frequency bands.

4. The method according to claim 1, wherein said identifying includes:
  identifying the presence of the radio service within a plurality of coarse frequency bands with a second resolution bandwidth;
  determining a first filtered signal value by applying a first notch filter with a smaller bandwidth than said second resolution bandwidth at a first position within one of the plurality of coarse frequency bands in which the presence of the radio service has been identified;
  determining a second filtered signal value by applying a second notch filter with a smaller bandwidth than said second resolution bandwidth at a second position within said one of the plurality of coarse frequency bands; and
  comparing said first filtered signal and said second filtered signal.

5. The method according to claim 4, wherein said second resolution bandwidth is equal to said frequency separation.

6. The method according to claim 4, wherein said first notch filter and said second notch filter have the same bandwidth.

7. The method according to claim 4, wherein said identifying within the plurality of coarse frequency bands includes applying a plurality of notch filters with a smaller bandwidth than said second resolution bandwidth at a corresponding plurality of positions within said one of the plurality of coarse frequency bands.

8. The method according to claim 7, wherein a number of said plurality of notch filters is determined based on the bandwidth of said notch filters, said frequency separation, and a radio service channel spacing of a potential conflicting shortwave radio transmission system.

9. The method according to claim 8, wherein said positions of said notch filters are equal to a potential radio service channel position of said shortwave radio transmission system.

10. A power line communication modem, comprising:
a receiver that receives a noise signal associated with a power line channel, said signal being Orthogonal Frequency Division (OFDM)-modulated on a set of sub-carriers, and said sub-carriers being separated by a frequency separation;
processing circuitry configured to identify a presence of a radio service within one or more fine frequency bands with a first resolution bandwidth by analyzing a plurality of fine frequency bands, said first resolution bandwidth being smaller than said frequency separation; and
circuitry configured to exclude a portion of a signal in at least one of the plurality of fine frequency bands, in which the presence of the radio service has been identified, before transmitting said signal with the portion excluded.

11. The power line communication modem according to claim 10, wherein the processing circuitry is configured to identify the presence of the radio service based on identifying signals of the radio service.

12. The power line communication modem according to claim 10, wherein the processing circuitry is configured to identify the presence of the radio service based on measuring noise associated with the plurality of fine frequency bands.

13. The power line communication modem according to claim 10, wherein the processing circuitry is configured to identify the presence of the radio service within a plurality of coarse frequency bands with a second resolution bandwidth, said power line communication modem further comprising:
notch filter circuitry configured to provide a first notch filter with a smaller bandwidth than said second resolution bandwidth at a first position within at least one of the plurality of coarse frequency bands in which the presence of the radio service has been identified, and to provide a second notch filter with a smaller bandwidth than said second resolution bandwidth at a second position within said at least one of the plurality of coarse frequency bands.

14. The power line communication modem according to claim 13, wherein said second resolution bandwidth is equal to said frequency separation.

15. The power line communication modem according to claim 13, wherein said notch filter circuitry includes:
a programmable notch filter, and
notch filter control circuitry configured to control bandwidth and position of said programmable notch filter.

16. The power line communication modem according to claim 15, further comprising:
notch filter shift control circuitry configured to shift the position of said programmable notch filter into a plurality of positions.

17. The power line communication modem according to claim 13, further comprising:
switching circuitry configured to switch said notch filter circuitry between a transmission position in a transmission path and a receiving position in a receiving path.

* * * * *